(12) United States Patent
McCaffrey et al.

(10) Patent No.: US 10,513,437 B2
(45) Date of Patent: Dec. 24, 2019

(54) SYSTEM AND METHODOLOGY UTILIZING A GETTER BASED STORAGE SYSTEM

(71) Applicant: SCHLUMBERGER TECHNOLOGY CORPORATION, Sugar Land, TX (US)

(72) Inventors: Ryan McCaffrey, Princeton, NJ (US); Aaron Stover, Pennington, NJ (US); Fadi Abu Ibrahim, Princeton Junction, NJ (US)

(73) Assignee: SCHLUMBERGER TECHNOLOGY CORPORATION, Sugar Land, TX (US)

( * ) Notice: Subject to any disclaimer, the term of this patent is extended or adjusted under 35 U.S.C. 154(b) by 0 days.

(21) Appl. No.: 15/220,210

(22) Filed: Jul. 26, 2016

(65) Prior Publication Data

US 2017/0031055 A1 Feb. 2, 2017

Related U.S. Application Data

(60) Provisional application No. 62/197,709, filed on Jul. 28, 2015.

(51) Int. Cl.
*C01B 4/00* (2006.01)
*F17C 11/00* (2006.01)
*C01B 3/00* (2006.01)
*E21B 47/10* (2012.01)

(52) U.S. Cl.
CPC ............. *C01B 4/00* (2013.01); *C01B 3/0026* (2013.01); *C01B 3/0078* (2013.01); *E21B 47/1015* (2013.01); *F17C 11/005* (2013.01); *Y02E 60/327* (2013.01)

(58) Field of Classification Search
CPC . H05H 3/06; Y02E 30/16; G21K 5/04; G21B 1/19
See application file for complete search history.

(56) References Cited

U.S. PATENT DOCUMENTS

| | | | | |
|---|---|---|---|---|
| 5,080,693 A | * | 1/1992 | Bourne | G21F 9/02 376/245 |
| 6,922,455 B2 | * | 7/2005 | Jurczyk | G21B 1/19 376/107 |
| 2013/0256522 A1 | | 10/2013 | Perkins et al. | |
| 2013/0294557 A1 | * | 11/2013 | Perkins | H05H 3/06 376/115 |

OTHER PUBLICATIONS

Moghadam et al. "Effect of rare earth elements on sorption characteristics of nanostructured Zr—Co sintered porous getters", Jan. 2015, Vacuum 111, p. 9-14 (Year: 2015).*
Giorgi, E. et al, "A New Ti-based Non-Evaporable Getter", Vacuum, vol. 41, No. 7-9, pp. 1935-1937 (1990).

* cited by examiner

*Primary Examiner* — Amber R Orlando
*Assistant Examiner* — Syed T Iqbal
(74) *Attorney, Agent, or Firm* — Sara K. M. Hinkley

(57) ABSTRACT

A technique may be employed to facilitate manufacturing/processing of generator tubes for use in a variety of logging applications. A getter-based gas storage chamber is provided with a getter able to adsorb a desired gas such as a deuterium and/or tritium gas. The getter-based gas storage chamber may be connected with a neutron tube via a gas flow network and a releasable coupling. The gas, e.g. deuterium and/or tritium gas, is released by heating the getter. The gas is allowed to flow through the gas flow network and into the neutron tube.

19 Claims, 4 Drawing Sheets

SYSTEM AND METHODOLOGY UTILIZING A GETTER BASED STORAGE SYSTEM

CROSS-REFERENCE TO RELATED APPLICATION

The present document is based on and claims priority to U.S. Provisional Application Ser. No. 62/197,709, filed Jul. 28, 2015, which is incorporated herein by reference in its entirety.

BACKGROUND

In many hydrocarbon well applications, well logging is used to collect data on formations which may contain reservoirs of hydrocarbon fluids. Various types of well logging instruments utilize a pulsed neutron generator having one or more sealed neutron generator tubes. A traditional method involves storing and introducing tritium gas to the neutron generator tubes via use of a uranium reservoir. A sealed stainless steel cylinder is employed to contain a uranium hydride storage bed. Heat is applied externally to an outer wall of the uranium-based tritium reservoir until sufficiently high temperatures cause tritium to be released from the uranium. At sufficiently low temperatures, the tritium re-adsorbs to the uranium. However, uranium can be difficult to use and it has certain inherent disadvantages because of the pyrophoric characteristics of uranium. Additionally, the structure of existing neutron generator systems can create difficulties in servicing or replacement of system components.

SUMMARY

In general, a system and methodology may be employed to facilitate manufacturing/processing of generator tubes for use in a variety of logging applications. According to an embodiment, a getter-based gas storage chamber is provided with a getter able to adsorb a desired gas such as a deuterium and/or tritium gas. The getter-based gas storage chamber may be connected with a neutron tube, of a neutron generator, via a gas flow network and a releasable coupling. The gas, e.g. deuterium and/or tritium gas, is released by heating the getter and the gas is allowed to flow through the gas flow network and into the neutron tube which can then be used in a desired radiation sampling technique during a logging operation.

However, many modifications are possible without materially departing from the teachings of this disclosure. Accordingly, such modifications are intended to be included within the scope of this disclosure as defined in the claims.

BRIEF DESCRIPTION OF THE DRAWINGS

Certain embodiments of the disclosure will hereafter be described with reference to the accompanying drawings, wherein like reference numerals denote like elements. It should be understood, however, that the accompanying figures illustrate the various implementations described herein and are not meant to limit the scope of various technologies described herein, and.

DETAILED DESCRIPTION

Figure 1:
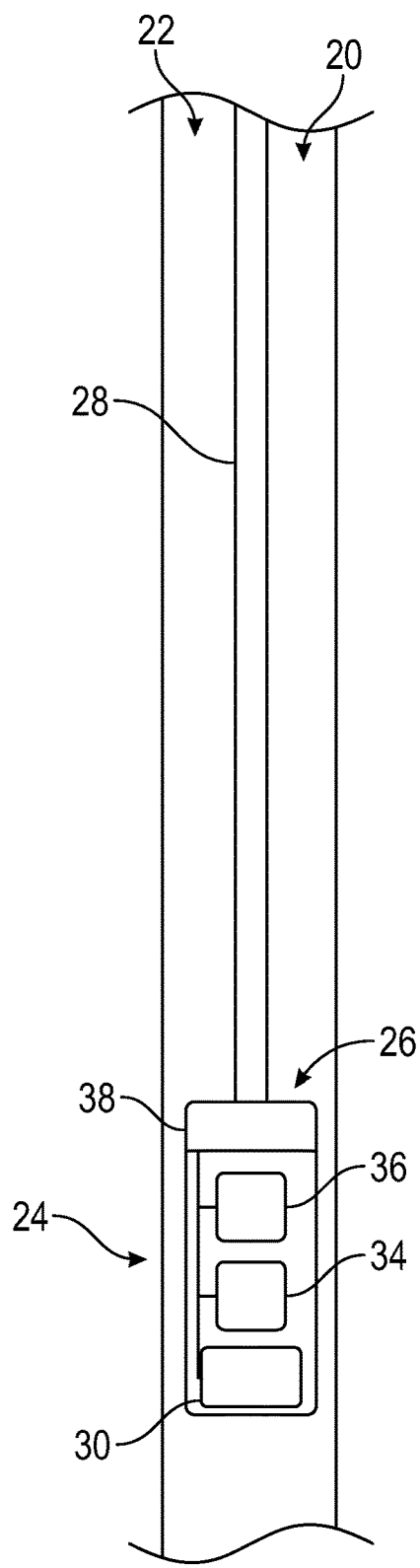
FIG. 1 is a schematic illustration of a well system having a wireline conveyed well logging instrument which may utilize an embodiment of a neutron tube system, according to an embodiment of the disclosure.

In the following description, numerous details are set forth to provide an understanding of some embodiments of the present disclosure. However, it will be understood by those of ordinary skill in the art that the system and/or methodology may be practiced without these details and that numerous variations or modifications from the described embodiments may be possible.

An embodiment of the present disclosure generally relates to a system and methodology which may be employed to facilitate manufacturing/processing of generator tubes for use in a variety of logging applications. A getter-based gas storage chamber is provided with a getter able to adsorb a desired gas such as a deuterium and/or tritium gas. In some applications, the getter-based gas storage chamber may be connected with a neutron tube, of a neutron generator, via a gas flow network and a releasable coupling. The gas, e.g. deuterium and/or tritium gas, is released by heating the getter and the gas is allowed to flow through the gas flow network and into the neutron tube which may then be used in a desired radiation sampling technique during a logging operation.

According to an embodiment, the present disclosure comprises a thermally reversible, getter-based deuterium and/or tritium storage system configured to store and release deuterium and/or tritium for manufacturing/processing neutron generator tubes. By way of example, the system may utilize a getter formed of a titanium-based hydride-adsorptive material which can act as a gas reservoir. The titanium-based hydride-absorptive material may be locally, resistively heated by an electrical heating element to trigger release of the deuterium and/or tritium gas. The localized heating element provides faster deuterium and/or tritium sorption times as compared to a traditional uranium-based reservoir while also showing performance that is at least equivalent to the traditional uranium-based reservoir over several thousands of thermal cycles. The getter-based deuterium and/or tritium storage system may be modular in design so as to render it substantially less expensive to manufacture and to facilitate disposal after use.

The getter-based gas storage system may be used with a variety of neutron generators, e.g. a pulsed neutron generator, which may comprise one or more neutron tubes. The neutron generator may be used to facilitate radiation-based logging applications. As described herein, the getter-based deuterium and/or tritium storage system may be employed during manufacturing/processing of the neutron tubes used with the pulsed neutron generator. Each neutron tube may comprise a target which includes adsorbed deuterium and/or tritium for promoting the release of neutrons.

A method of generating neutrons for use in a radiation-based logging operation may comprise placing deuterium and/or tritium gas in a getter-based storage chamber. The deuterium and/or tritium gas is adsorbed by thermally reversible hydride adsorptive particles dispersed in the getter. However, the deuterium and/or tritium gas may be released and raised to a selected pressure by heating the getter. Effectively, the deuterium and/or tritium gas is ionized, and the ionized gas is accelerated so as to move into the neutron tube and to strike the target therein. The accelerated ions react with the adsorbed deuterium and/or tritium in the target.

The neutron generator and getter-based gas storage system described herein may be used in a variety of neutron tube manufacturing and processing applications. The neutron tubes may then be used in logging systems. Referring generally to FIG. 1, an example of a logging system 20 is illustrated. In this embodiment, the logging system 20 is deployed downhole into a wellbore 22 drilled into a subsurface formation 24. The logging system 20 may comprise a neutron-based logging instrument 26, e.g. a pulsed neutron logging instrument, suspended in wellbore 22 by a cable 28, e.g. an armored electrical cable. Depending on the application, the logging instrument 26 may be a single component or cooperating components and may be combined with other logging tools. The cable 28 may be deployed by a winch mechanism or other suitable mechanism so as to deploy logging instrument 26 to a desired depth or depths in wellbore 22 for performance of the desired radiation-based logging operation.

In some applications, the logging instrument 26 may comprise devices to shift the logging instrument 26 against the open wellbore wall or against the surrounding wellbore casings during logging. The logging instrument 26 also may utilize various other components in desired configurations to facilitate logging operations. In the illustrated example, the logging instrument 26 comprises a neutron generator 30, e.g. a pulsed neutron generator. (As discussed in greater detail below with reference to FIGS. 3-6, the manufacturing and processing of neutron generator 30 is facilitated with a getter-based gas storage system 32.) As illustrated in FIG. 1, the logging instrument 26 also may comprise a near-spaced radiation detector 34 and a far-spaced radiation detector 36. An electronics module 38 may be coupled with the components of logging instrument 26 and may serve as acquisition, control, and telemetry electronics. For example, the electronics module 38 may be used to control the timing of the pulsed neutron generator 30 and the corresponding timing of detection time gates for the near-spaced radiation detector 34 and the far-spaced radiation detector 36.

Figure 2:
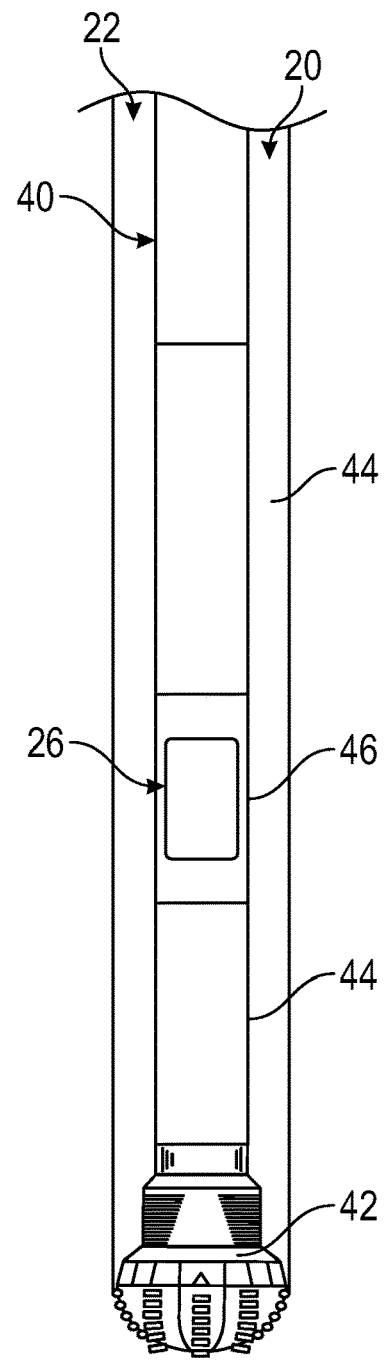
FIG. 2 is a schematic illustration of a well system comprising a drill having a while-drilling well logging instrument which may utilize an embodiment of a neutron tube system, according to an embodiment of the disclosure.

Referring generally to FIG. 2, another embodiment of logging instrument 26 is illustrated in a while-drilling application. In this example, the logging system 20 is combined into a drill string 40 used to drill wellbore 22. Depending on the parameters of a given drilling operation, the drill string 40 may comprise a variety of components, including a variety of bottom hole assemblies having steering devices which may be used to guide drilling along a desired trajectory. By way of simplified example, the drill string 40 may comprise a drill bit 42 and desired combinations of stabilizer collar sections 44 and drill collar sections 46. The logging instrument 26 may be located in a suitable collar section, such as drill collar section 46.

Figure 3:
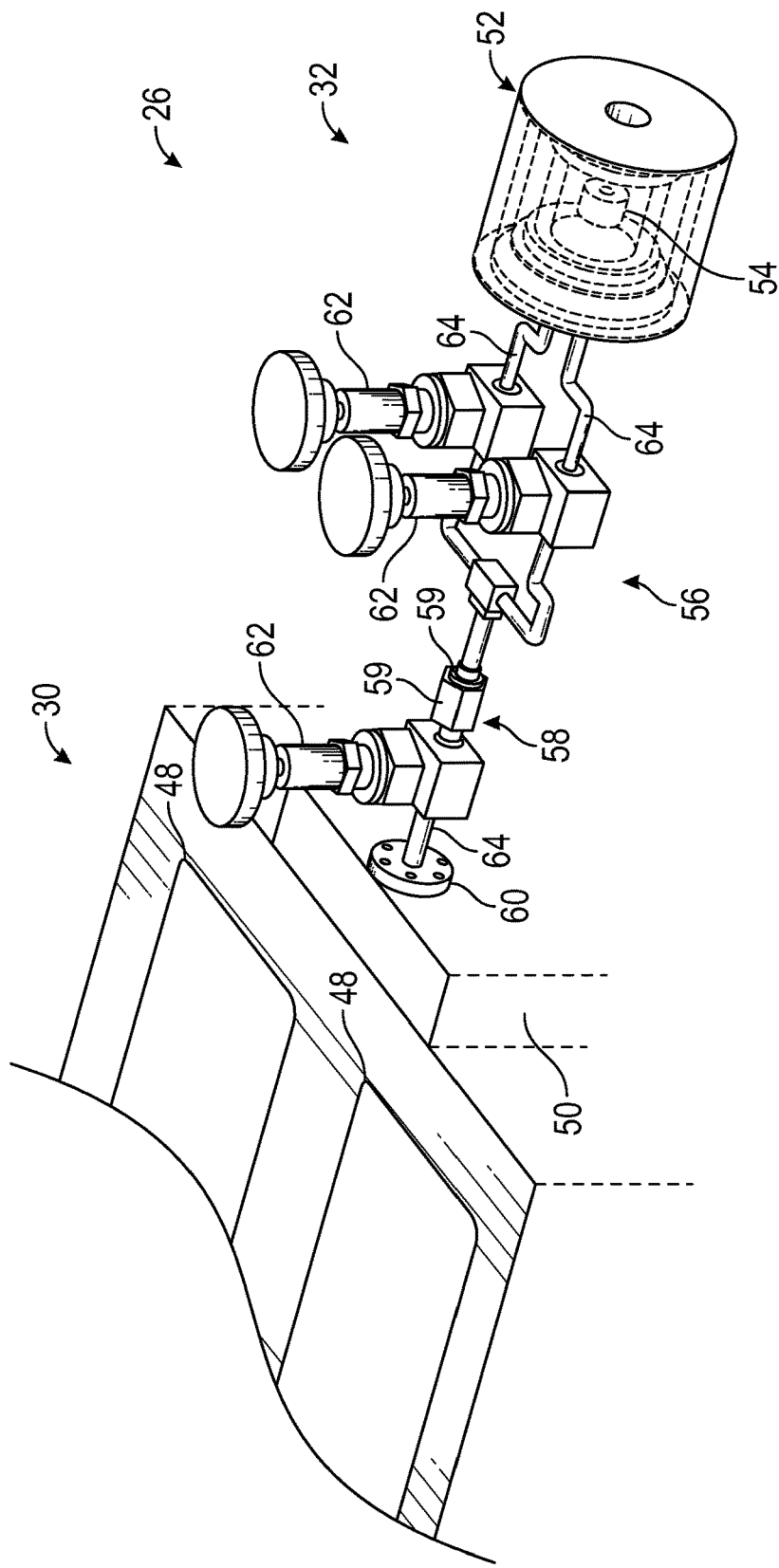
FIG. 3 is an orthogonal view of a modular, getter-based gas storage system which may be used to facilitate the manufacturing/processing of a neutron tube for use in a logging instrument, according to an embodiment of the disclosure.

Referring generally to FIG. 3, an embodiment of at least a portion of logging instrument 26 is illustrated during a manufacturing or processing stage. In this example, the neutron generator 30, e.g. a pulsed neutron generator, may be coupled with getter-based gas storage system 32 during this manufacturing/processing stage. By way of example, neutron generator 30 may comprise at least one neutron tube 48 coupled in communication with the getter-based gas storage system 32. In some applications, individual neutron tubes 48 are coupled with getter-based gas storage system 32. The neutron tube or tubes 48 may be coupled with getter-based gas storage system 32 via a manifold 50, e.g. a processing station manifold. The manifold 50 allows flow of gas, e.g. gas containing deuterium and/or tritium, between getter-based gas storage system 32 and the neutron tube(s) 48.

In the embodiment illustrated, the getter-based gas storage system 32 comprises a getter-based storage chamber 52 containing a getter 54. The getter-based storage chamber 52 is constructed to store and release at least one of deuterium and tritium in the form of a gas. The getter-based gas storage system 32 further comprises a flow network 56 coupled between, for example, manifold 50 and the getter-based storage chamber 52 to enable flow of gas between the getter-based storage chamber 52 and manifold 50. During a processing operation, for example, the gas (e.g. deuterium and/or tritium gas) is able to flow through the flow network 56 and manifold 50 thus enabling movement of the gas between getter-based storage chamber 52 and the at least one neutron tube 48.

The getter-based gas storage system 32 may be structured as a modular system to facilitate release and disposal of the getter-based storage chamber 52. By way of example, a releasable coupling 58 may be located to enable a quick and easy decoupling and release of the getter-based storage chamber 52. The releasable coupling 58 may comprise a variety of coupling configurations including snap couplings or threaded couplings. In the illustrated example, the releasable coupling 58 comprises a pair of threaded coupler ends 59 which may be threaded together into sealing engagement. By way of example, the releasable coupling 58 may comprise a metal gasket seal which facilitates sealing engagement between the manifold side and the getter-based storage chamber side of the system 32. In a specific embodiment, the releasable coupling 58 may be formed with a VCR™ fitting available from the Swagelok™ Corporation. The releasable coupling 58 may be positioned along flow network 56, as illustrated, or at another suitable location.

Accordingly, the getter-based gas storage system 32 may be configured to safely and efficiently introduce deuterium and/or tritium gas to the at least one neutron generator tube 48. In some embodiments, the interface between flow network 56 and manifold 50 may comprise a vacuum flange 60 to enable application of an initial vacuum within flow network 56 and getter-based storage chamber 52. The flow network 56 may further comprise a plurality of valves 62, e.g. three valves, which may be selectively opened to allow flow of gas along flow network 56 and closed to block flow of gas along flow network 56. The valves 62 may be used in cooperation to control the flow of gas into and out of the getter-based storage chamber 52. For example, the valves 62 may be shifted to a closed position when the modular getter-based storage chamber 52 is decoupled at releasable coupling 58 for disposal and/or replacement.

In the example illustrated, at least one valve 62 is disposed between releasable coupling 58 and manifold 50; and at least one valve 62 is disposed between releasable coupling 58 and getter-based storage chamber 52. By way of example, the flow network 56 may comprise a single flow line 64 extending between releasable coupling 58 and manifold 50 and a pair of flow lines 64 extending to getter-based storage chamber 52, as illustrated. Each flow line 64 may be combined with a single valve 62 for a total of three valves with at least one valve on each side of the releasable coupling 58. A variety of suitable valves 62 is available from the Swagelok™ Corporation.

Figure 4:
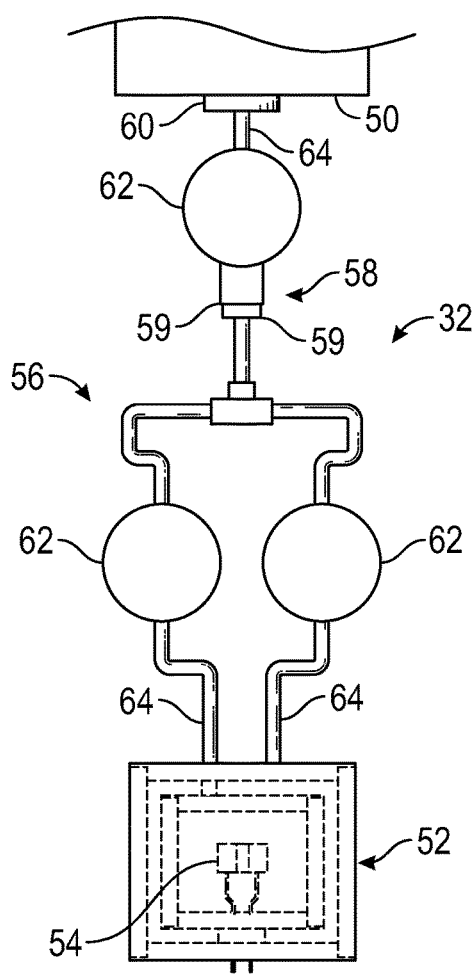
FIG. 4 is a front view of a modular, getter-based gas storage system which may be used in combination with a neutron tube, according to an embodiment of the disclosure.
Figure 5:
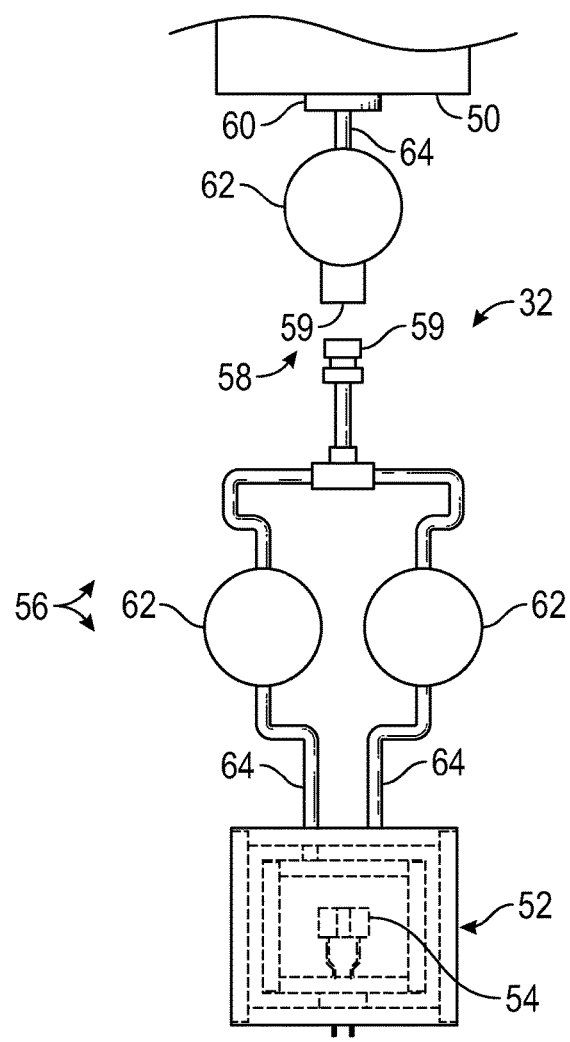
FIG. 5 is an illustration similar to that of FIG. 4 in which the modular, getter-based gas storage system has been separated at a releasable coupling, according to an embodiment of the disclosure.

With additional reference to FIGS. 4 and 5, the getter-based gas storage system 32 is illustrated in an operational configuration (see FIG. 4) and in a decoupled configuration for disposal of getter-based gas storage chamber 52 (see FIG. 5). In the operational configuration, valves 62 are in an open flow position and the getter-based gas storage chamber 52 is in communication with manifold 50 and thus with neutron tube 48 of neutron generator 30. The releasable coupling 58, however, enables easy decoupling of getter-based gas storage chamber 52 for disposal. In the decoupled example illustrated in FIG. 5, the valves 62 are closed prior to separating the releasable coupling 58 so as to prevent release of gas from either the manifold side or the getter-based gas storage chamber side.

Figure 6:
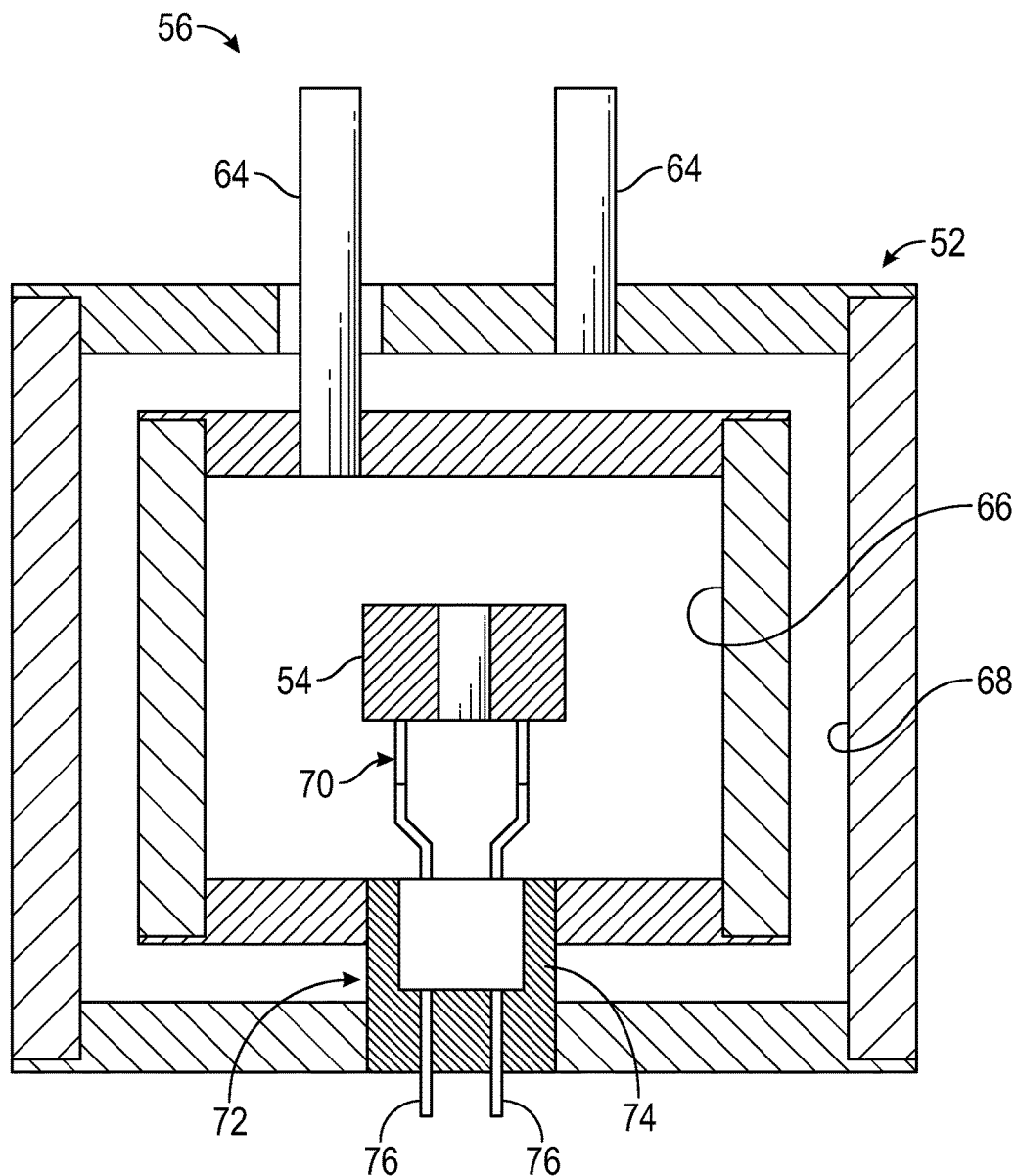
FIG. 6 is a cross-sectional, schematic illustration of an example of a getter-based gas storage chamber containing a getter and an electrical feed through, according to an embodiment of the disclosure.

Referring generally to FIG. 6, an embodiment of the getter-based storage chamber 52 is illustrated. In this example, the storage chamber 52 is in the form of a deuterium and/or tritium storage chamber. The illustrated storage chamber 52 has a dual chamber configuration with a sealed inner chamber 66 and a sealed outer chamber 68 surrounding the inner chamber 66. The outer chamber 68 provides redundancy and secondary containment in the event of a leak from inner chamber 66. The double chamber/double wall design also serves to limit deuterium and/or tritium diffusion from the inner chamber 66 to the outside environment. In a variety of embodiments, the chambers are constructed to enable maintenance of ultrahigh vacuum pressures between the walls of the inner chamber 66 and outer chamber 68. For some applications, an individual flow line 64 may be coupled with each chamber 66, 68.

As further illustrated in FIG. 6, the getter 54 may be disposed within inner chamber 66 of getter-based gas storage chamber 52. The getter 54 may be selectively heated via an electrical heating element 70 also disposed within getter-based gas storage chamber 52, e.g. within inner chamber 66. The electrical heating element 70 may be a resistive heating element supplied with electrical power via an electrical feed through 72. Feed through 72 provides a sealed feed through for supplying electrical power to the interior of inner chamber 66.

As illustrated, the electrical feed through 72 may comprise a feed through housing structure 74 extending through outer chamber 68 and into inner chamber 66. The electrical feed through 72 further comprises electrical conductors 76 routed along the feed through housing structure 74 for coupling with electrical heating element 70. Electrical power may be selectively supplied to electric heating element 70 via an outside power supply so as to enable selective heating of the getter 54 and thus release of the deuterium and/or tritium gas. When flow network 56 is open, the released deuterium and/or tritium gas is able to flow through the flow network 56 and into the corresponding neutron tube or tubes 48.

Depending on the application, the getter 54 may have a variety of configurations and may be formed from appropriate materials. For example, the getter 54 may be formed from a sintered, porous material having interspersed particles of, for example, titanium and molybdenum. An example of such material is sold in the form of completed getters by SAES GETTERS S.pA., Via Gallarate 215, 20151 Milan Italy under product designation S5K0370.

The material of getter 54 can be used to adsorb molecules containing, for example, hydrogen, carbon, and/or oxygen. This adsorption of such molecules enables maintenance of a high vacuum level within getter-based gas storage chamber 52. The use and performance of such a getter material is described in various publications, such as E Giorgi, C Boffito and M Bolognesi, A new Ti-based non-evaporable getter, Vacuum, vol. 41, number 7-9, pp. 1935 to 1937 (1990).

Although the embodiment described above utilizes titanium particles interspersed in a sintered, porous getter material of getter 54, other thermally reversible hydride-adsorptive materials may be used. For example, thermally reversible hydride-adsorptive material particles in the form of, for example, zirconium, scandium, erbium, yttrium, and vanadium, may be interspersed in the sintered getter material. Such materials are able to adsorb, for example, deuterium and/or tritium gas and to release the gas upon heating the getter 54. Certain other aspects related to examples of getter 54 and neutron generator 30, e.g. a pulse neutron generator, may be found in the co-pending, co-assigned patent application publication US20130256522, the entire content of which is hereby incorporated by reference in its entirety.

Depending on the parameters of a given application and/or environment, the components and structure of logging system 20 may vary. With respect to logging instrument 26, the instrument may have several different configurations selected for use in many types of boreholes to obtain logging data on various types of formations 24. The arrangement of radiation detectors 34, 36 and electronics 38 may be adjusted for different applications.

Similarly, the getter-based gas storage system 32 may comprise various types of getter-based storage chambers 52 for supplying deuterium and/or tritium gas to neutron tubes of a pulse neutron generator or other type of neutron generator 30. The flow network 56 may utilize different types of configurations with different numbers of flowlines 64 and valves 62 to facilitate movement of gas between getter-based gas storage chamber 52 and the at least one neutron tube 48. Coupling mechanism 58 also may comprise various types of connectors and may be positioned at various locations between getter-based storage chamber 52 and neutron generator 30, e.g. at various positions along flow network 56. The structure and materials of getter 54 and chambers 66, 68 also may be selected according to the parameters of a given logging operation.

Although a few embodiments of the disclosure have been described in detail above, those of ordinary skill in the art will readily appreciate that many modifications are possible without materially departing from the teachings of this disclosure. Accordingly, such modifications are intended to be included within the scope of this disclosure as defined in the claims.

What is claimed is:

1. A system, comprising:
   a getter-based storage chamber containing a getter, the getter-based storage chamber being configured to store and release at least one of deuterium and tritium;
   a manifold coupled to a neutron tube;
   a flow network coupled between the manifold and the getter-based storage chamber to enable flow of gas between the getter-based storage chamber and the manifold; and a releasable coupling positioned between the manifold and the getter-based storage chamber to enable disconnection of the getter-based storage chamber and the neutron tube;

a neutron tool configured to incorporate the disconnected neutron tube.

2. The system as recited in claim 1, wherein the flow network comprises a plurality of valves closable to block flow of gas along the flow network.

3. The system as recited in claim 2, wherein the plurality of valves comprises at least one valve between the releasable coupling and the manifold and at least one valve between the releasable coupling and the getter-based storage chamber.

4. The system as recited in claim 3, wherein the plurality of valves comprises three valves.

5. The system as recited in claim 1, wherein the getter comprises a porous sintered material with dispersed particles having gas adsorbed on the dispersed particles.

6. The system as recited in claim 5 wherein the gas adsorbed on the dispersed particles comprises either deuterium or tritium.

7. The system as recited in claim 1, wherein the neutron tube is part of a pulsed neutron generator.

8. The system as recited in claim 1, further comprising an electrical heating element disposed in the getter-based storage chamber to enable selective heating of the getter.

9. The system as recited in claim 8, further comprising an electrical feed through extending into an interior of the getter-based storage chamber to enable electrical power to be supplied to the electrical heating element.

10. A system for manufacturing/processing a neutron tube, comprising a modular getter-based gas storage system having:

a getter-based gas storage chamber;

a getter disposed in the getter-based gas storage chamber, the getter adsorbing at least one of deuterium and tritium gas;

an electrical heating element disposed in the getter-based gas storage chamber to enable selective heating of the getter;

a gas flow network coupled to the getter-based gas storage chamber; and a neutron tube coupled to the modular getter-based gas storage system via a manifold.

11. The system as recited in claim 10, further comprising a releasable coupling connected to the gas flow network to enable release and disposal of the getter-based gas storage chamber.

12. The system as recited in claim 10, wherein the getter comprises a porous sintered material.

13. The system as recited in claim 10, wherein the getter comprises dispersed particles having at least one of the deuterium and tritium gas adsorbed on the dispersed particles.

14. The system as recited in claim 10, wherein the gas flow network comprises valves closable to block escape of gas from the gas flow network.

15. A method for manufacturing or processing a neutron tube, comprising:

providing a getter-based gas storage chamber with a getter;

connecting the getter-based gas storage chamber with the neutron tube via a gas flow network and a releasable coupling;

heating the getter to release a gas;

allowing the gas to flow through the gas flow network and into the neutron tube; and assembling the neutron tube into a tool.

16. The method as recited in claim 15, wherein heating the getter to release the gas comprises releasing at least one of deuterium and tritium.

17. The method as recited in claim 15, further comprising providing the getter with dispersed particles having the gas adsorbed on the dispersed particles.

18. The method as recited in claim 15, wherein heating comprises heating an electrical heating element with electricity provided via an electrical feed through extending into the getter-based gas storage chamber.

19. The method as recited in claim 15, further comprising using the releasable coupling to release the getter-based gas storage chamber for disposal.

\* \* \* \* \*